US007076244B2

United States Patent
Lazaridis et al.

(10) Patent No.: US 7,076,244 B2
(45) Date of Patent: Jul. 11, 2006

(54) SYSTEM AND METHOD FOR PUSHING INFORMATION TO A MOBILE DEVICE

(75) Inventors: Mihal Lazaridis, Waterloo (CA); Gary P. Mousseau, Waterloo (CA); Michael S. Brown, Waterloo (CA)

(73) Assignee: Research In Motion Limited, Waterloo (CA)

( * ) Notice: Subject to any disclaimer, the term of this patent is extended or adjusted under 35 U.S.C. 154(b) by 671 days.

(21) Appl. No.: 10/201,495

(22) Filed: Jul. 23, 2002

(65) Prior Publication Data

US 2003/0026231 A1    Feb. 6, 2003

Related U.S. Application Data

(60) Provisional application No. 60/307,265, filed on Jul. 23, 2001.

(51) Int. Cl.
*H04M 3/42*    (2006.01)
(52) U.S. Cl. .................................... 455/414.2; 705/14
(58) Field of Classification Search ................. None
See application file for complete search history.

(56) References Cited

U.S. PATENT DOCUMENTS

| | | | | |
|---|---|---|---|---|
| 6,442,577 B1 * | 8/2002 | Britton et al. | ............... | 715/513 |
| 6,668,177 B1 * | 12/2003 | Salmimaa et al. | .......... | 455/566 |
| 6,826,614 B1 * | 11/2004 | Hanmann et al. | ........... | 709/227 |
| 6,909,903 B1 * | 6/2005 | Wang | ....................... | 455/456.1 |
| 2002/0046084 A1 * | 4/2002 | Steele et al. | .................. | 705/14 |
| 2002/0069105 A1 * | 6/2002 | do Rosario Botelho et al. | ........................... | 705/14 |
| 2002/0078382 A1 * | 6/2002 | Sheikh et al. | ................ | 713/201 |

* cited by examiner

*Primary Examiner*—Fan Tsang
*Assistant Examiner*—Aung T. Win
(74) *Attorney, Agent, or Firm*—Jones Day; Krishna K. Pathiyal; Robert C. Liang (57) ABSTRACT

A system for pushing information to a mobile device includes a information source, a wireless network, and a proxy content server. The information source stores information. The wireless network sends and receives transmissions to and from the mobile device. The proxy content server is coupled to information source and the wireless network and receives information from the information source. In addition, the proxy content server stores information received from the information source to one of a plurality of channels based on predefined information categories, and automatically transmits information from a selected channel over the wireless network to the mobile device.

14 Claims, 9 Drawing Sheets

SYSTEM AND METHOD FOR PUSHING INFORMATION TO A MOBILE DEVICE

CROSS-REFERENCE TO RELATED APPLICATION

This application claims priority from and is related to the following prior application: System And Method For Pushing Information To A Mobile Device, U.S. Provisional Application No. 60/307,265, filed Jul. 23, 2001. This prior application, including the entire written description and drawing figures, is hereby incorporated into the present application by reference.

FIELD OF THE INVENTION

This invention relates to pushing information to a mobile handheld communication device. More particularly, a system and method for pushing information to a mobile handheld communication device is provided in which the pushed information may be controlled and monitored by a user through selectable channels or content categories accessible to the user through the mobile handheld communication device. The invention is particularly well suited for use with Personal Digital Assistants (PDAs), cellular telephones, and other mobile handheld communication devices (collectively referred to herein as "mobile devices").

BACKGROUND OF THE INVENTION

Systems for transmitting information from databases in a computer network, such as World-Wide-Web (WWW) servers on the Internet, over a wireless network to a mobile device are known. Typically, most such systems utilize a "synchronization" or "pull" method in which a command must be executed at the mobile device in order to connect to the computer network and initiate the transfer of information over the wireless network. In addition, some paging networks offer services to automatically "push" small amounts information to alphanumeric paging devices, such as sports scores, weather reports, or stock information.

SUMMARY

A system for pushing information to a mobile device includes an information source, a wireless network, and a proxy content server. The information source stores information. The wireless network sends and receives transmissions to and from the mobile device. The proxy content server is coupled to the information source and the wireless network and receives information from the content server. In addition, the proxy content server stores information received from the information source to one of a plurality of channels based on pre-defined information categories, and automatically transmits information from a selected channel over the wireless network to the mobile device.

DETAILED DESCRIPTION

Figure 1:
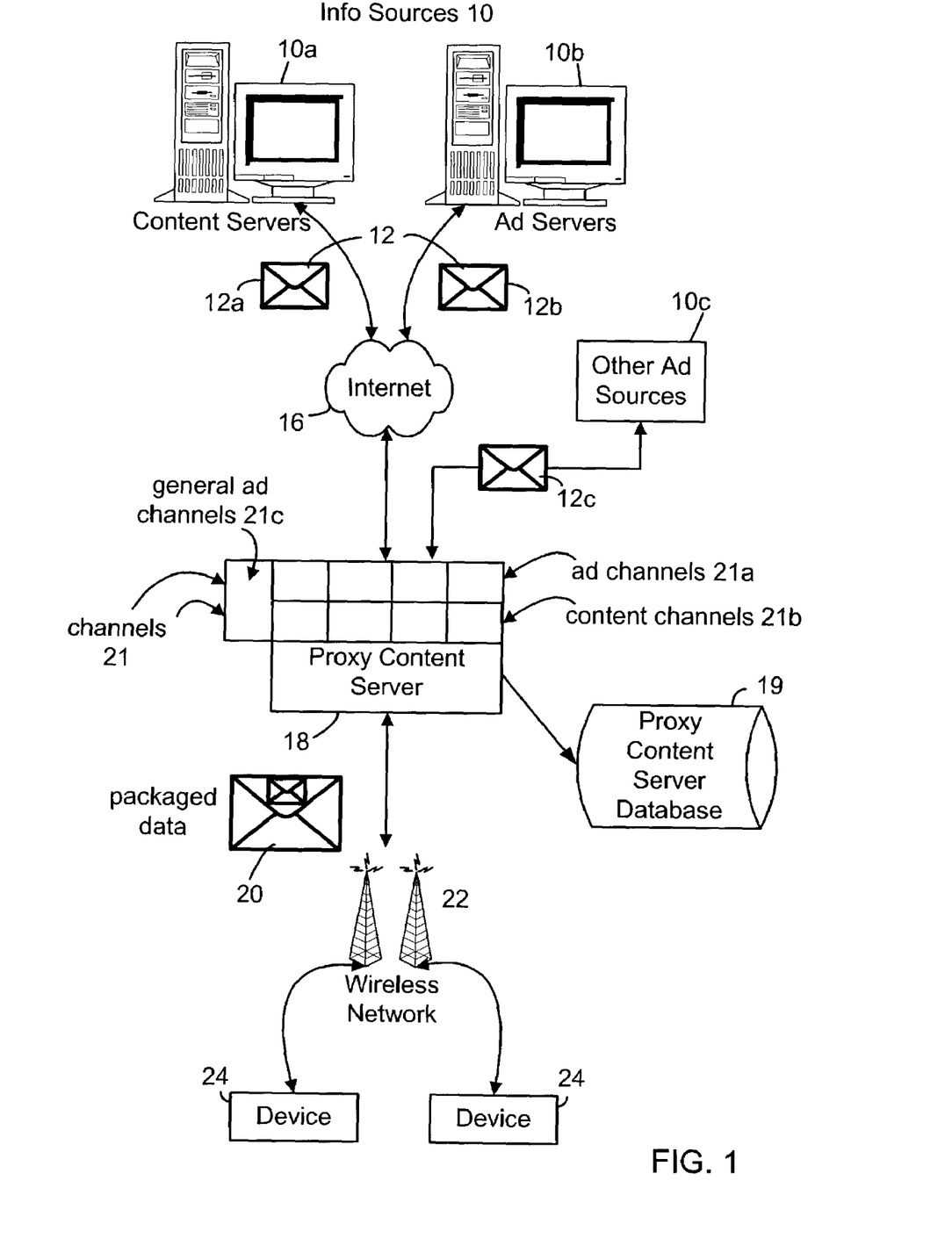
FIG. 1 is a block diagram of an exemplary system for pushing information to a mobile device.

Referring now to the drawings, FIG. 1 is a block diagram of an exemplary system for pushing information to a mobile device 24. The illustrated system includes a plurality of Information Sources 10, a Proxy Content Server 18, a Proxy Content Server Database 19, and a plurality of mobile devices 24. Also illustrated in FIG. 1 is a computer network 16, such as the Internet, that links the Information Sources 10 and the Proxy Content Server 18, and a wireless network 22 that links the Proxy Content Server 18 and the mobile devices 24.

The Information Sources 10 may, for example, be a series of computers or databases on a local area network (LAN) available through a computer network, such as the Internet 16. Information Sources 10 are made up of a plurality of Content Servers 10a, Advertising Servers 10b and Other Advertising Sources 10c. Content Servers 10a provide real and usable data 12a for the Proxy Content Server 18. Content Servers 10a may, for example, provide information 12a, such as stock prices, flight information, banking information, e-mail information, sports information, financial data, real estate information, auctions, newsgroups, instant messaging information, career news, company data, headline news stories, and/or some other type of information. Advertising (Ad) Servers 10b provide additional or complementary information for the mobile device user. Ad Servers 10b may include information such as coupon deals, timed sales events, brand recognition ads, company ads, testimonials, product placement ads and other advertising for the mobile device user. The third information source 10c may be from other advertising sources that can transmit advertisements directly to the Proxy Content Server 18, for example via a modem connection or a direct connection to the Proxy Content Server 18. These advertising sources may, for example, include direct phone-in ads, faxed ads, e-mail ads and other advertising sources. In one embodiment, for example, the first two Information Sources 10a, 10b may be Internet or Intranet world-wide-web (WWW) servers that include aggregated Internet or Intranet world-wide web (WWW) content, accessible as HTML, HDML, WML or Java web pages.

The Proxy Content Server 18 may, for example, be a wireless proxy server that functions as a gateway between the computer network 16 and the wireless network 22. The Proxy Content Server 18 aggregates existing information 12, such as Internet or Intranet content, from one or more Information Sources 10, and pushes the information 12 to a mobile device 24. The Proxy Content Server 18 also provides a method of combining the information so that the mobile device user has a consistent and transparent experience of receiving both information content and advertising content. The "push" paradigm employed by the Proxy Content Server 18 continuously formats or packages information for transmission over the wireless network 22, and automatically transmits the user-selected items of information to the mobile device 24. For example, information 12 from an Information Source 10 may be sent over the Internet 16 and collected by the Proxy Content Server 18. The Proxy Content Server 18 may, for example, either poll the Information Source 10 for updated information 12, or receive updated information 12 that is automatically transmitted or pushed from the Information Source 10. The Proxy Content Server 18 automatically combines the data into packages 20 based on each user's preference, and transmits or pushes the data packets 20 over the wireless network 22 to a mobile device 24. The combining of information may be achieved in several ways based on the implementation of the Proxy Content Server 18 and based on mobile device user preferences. One possible goal of combining information with advertising content is to achieve a revenue source for the provider of the information so the mobile device user gets a reduce or free information service.

In alternative embodiments, the Proxy Content Server 18 could be on either side of the Internet 16, depending on what extra processing is required to push information to the mobile devices 24 over the Wireless Network 22. Also, depending on the content provider, the Proxy Content Server 18 might not be allowed in close proximity to the content itself.

In order to facilitate the transmission of information 12 from an Information Source 10 to the Proxy Content Server 18, an initialization procedure may be performed between the Proxy Content Server 18 and the Information Source 10. The initialization procedure may, for example, provide the Proxy Content Server 18 with the format and type of data to be extracted from a given Information Source 10. The initialization may be performed by registering the Information Source 10 with the Proxy Content Server 18, enrolling the Proxy Content Server 18 with the Information Source 10, or by some other suitable means. Alternatively, when the content being accessed by the Proxy Content Server 18 is public information, such as sport scores, stock prices, general advertising information and the like, the Proxy Content Server 18 may be configured with the URL (Universal Resource Locator) of the Information Source 10. Using the URL, the content can be retrieved, formatted and trimmed down completely at the Proxy Content Server 18 with no direct involvement from the originator or the Information Source 10.

For advertising content 12b, 12c the initialisation and configuration procedures might be more extensive and might include some additional steps. In some cases, a simple URL may be used to retrieve advertising content. In other cases, the URL is combined with rules regarding how often to use the advertising, which content the advertising applies to, and time parameters regarding when to display the ads. In other embodiments, the ads might be received via third parties, phone conversations, fax transmissions, or through some other communication means. Once these content sources 10c are received and processed, they may also be combined with configuration information regarding which information channels to apply them to and when.

As information 12 from an Information Sources 10 is received by the Proxy Content Server 18, the information is collected into channels or categories 21. The channels 21 may be memory locations on the Proxy Content Server 18, memory locations on a database 19 coupled to the Proxy Content Server 18, cache memory location on the Proxy Content Server 18, or memory locations on some other memory device accessible by the Proxy Content Server 18. In addition to storing information to the channel locations 21, the Proxy Content Server 18 may also store the information and other data to a local Proxy Content Server Database 19. Some examples of the type of data that may be stored in the Proxy Content Server Database 19 are device location information, accounting information, user commands, information received from an Information Sources 10, information previously transmitted to a mobile device 24, or other relevant information. The Proxy Content Server 18 may, for example, consult the Proxy Content Server Database 19 before transmitting information to a mobile device 24 in order to determine if the information should be transmitted. The interaction between the Proxy Content Server 18 and the Proxy Content Server Database 19 is described in more detail below with reference to FIGS. 6–8.

The Proxy Content Server 18 may be implemented in several ways and one embodiment is shown in FIG. 1. In this illustration, the Proxy Content Server 18 has advertising channels 21a, content channels 21b and general advertising channels 21c. If advertisers have a preference for their advertisements to be included with a particular type of content channel, then all advertisements go into the corresponding channel for that content. If advertisers do not have a preference, then the general advertising channel 21c is used and it is applied across all content channels 21b equally. For example, a company offering financial services may advertise in the stock quotes and financial content channel, while advertising for new movies may be applied across all content channels equally.

The Proxy Content Server 18 stores received information 12 to a particular channel 21 based on user specific information categories. For example, the Proxy Content Server 18 may provide the user of a mobile device 24 with the ability to control content information or other information that is streaming from the Proxy Content Server 18 to the mobile device 24 by offering direct control over each type of information being pushed. A mobile device user may be able to control when the information will be pushed to the device, for instance by transmitting a signal to the Proxy Content Server 18 to suspend delivery of information until a more convenient time. In another example, a mobile device user may be able to control the information pushed to the mobile device 24 based on the geographical location of the device 24, based on certain triggering events, or based on some other pre-selected criteria. Each channel 21, may thus represent a category of information that the user may, or may not, be interested in receiving at her mobile device 24 at a given point in time or at a particular geographical location.

Similarly, the mobile device user may have control over how many advertisements are presented to her over one or all content channels. The combining of content information and advertising information is done in such a way that the user may decide to view the advertisements or not to view the advertisements. For example, in some cases, if the user is hungry around a meal time, then the user may have a strong desire and interest to view a special meal coupon for a restaurant. In other cases, the user may not want a new financial adviser but accept the advertisement for the new financial adviser to reduce the cost of that information source.

In order to control the categories of information pushed from the Proxy Content Server 18, the mobile device 24 may transmit a signal to the Proxy Content Server 18 that provides the Proxy Content Server 18 with feedback information, such as the device's geographical location, the time of day, a user command, or some other type of information. The Proxy Content Server 18 releases information, such as bulletins and advertising, that match the geographical location, time of day, user command, and/or any other criteria configured in the Proxy Content Server 18. At any time, the user may activate other categories of information, which would also be recorded by the Proxy Content Server 18 and cause some automatic push adjustments.

The wireless network 22 may be a traditional radio frequency (RF) network, such as a cellular network, that utilizes base stations to exchange information with the mobile devices 24. The data packets 20 pushed from the Proxy Content Server 18 over the wireless network 22 are received and formatted by the mobile device 24 and may, for example, be presented to an individual user based on the user's actions; i.e. whether the user accepts or rejects looking at advertising content. Each mobile device 24 may have a known address or access code that enables the wireless network 22 to deliver the pushed information, and may also have an implicit location in the wireless network 22 that is based on which base station is receiving and supporting signals from the device 24. As noted above, the location of the mobile device 24 in the wireless network 22, along with other feedback information, may be tracked by the mobile device 24 and transmitted back to the Proxy Content Server 18 where it is used to determine relevant categories of information to push to the mobile device 24. Alternatively, the location of the mobile device 24 in the wireless network 22 may be tracked by the base stations in the wireless network 22 and fed back to the Proxy Content Server 18, for example as the location of a mobile device 24 in the wireless network 22 changes.

Following is one example of how the system illustrated in FIG. 1 may be used by a fictitious Company X. Company X operates a Content Server 10a, and offers a wireless device 24 and service free to its customers. The customer may, for example, be required by Company X to view a set number of advertisements each day in order to pay for the service automatically, otherwise the customer may be required to pay Company X directly for the service. As the customer travels and uses the mobile device 24, the customer may arrange for other non-advertisement information, such as news and weather information, available from Company X's Content Server 10a to be pushed to the device 24. With this news service provided by Company X, advertising data may, for example, be added to the news channel by the Proxy Content Server 18 in order to help cover costs of the service. The Proxy Content Server 18 receives this information from a corresponding Advertising Server 10b or from other advertising sources 10c. The Proxy Content Server 18 then preferably makes intelligent choices, based on user location, and content as to when to insert advertising into the content data stream to the mobile device user. If the user travels to another area, then the user may decide to access the information channel of that area and turn off the information channel for the prior location. Since the user has selected a new channel, the Proxy Content Server 18 may then begin sending the device 24 advertisement information relating to accommodations available in the new location. Since location of the mobile device 24 in the wireless network 22 is tracked and fed back to the Proxy Content Server 18, the Proxy Content Server 18 may begin pushing information relevant to the new location of the mobile device 24 in a timely manner.

In another embodiment, the Proxy Content Server 18 may forward location and preferences received from the mobile device 24 to the Content Server 10a and Ad Server 10b. In this case, the Content Server 10a and Ad Server 10b preferably make the decision regarding when to insert advertising and when to change the type of advertising going to a given mobile device user. In this embodiment, the method of packaging the information to the mobile device 24 is preferably communicated to the Content Server 10a, so that the combining step would be handled directly by the Content Server 10a.

Figure 2:
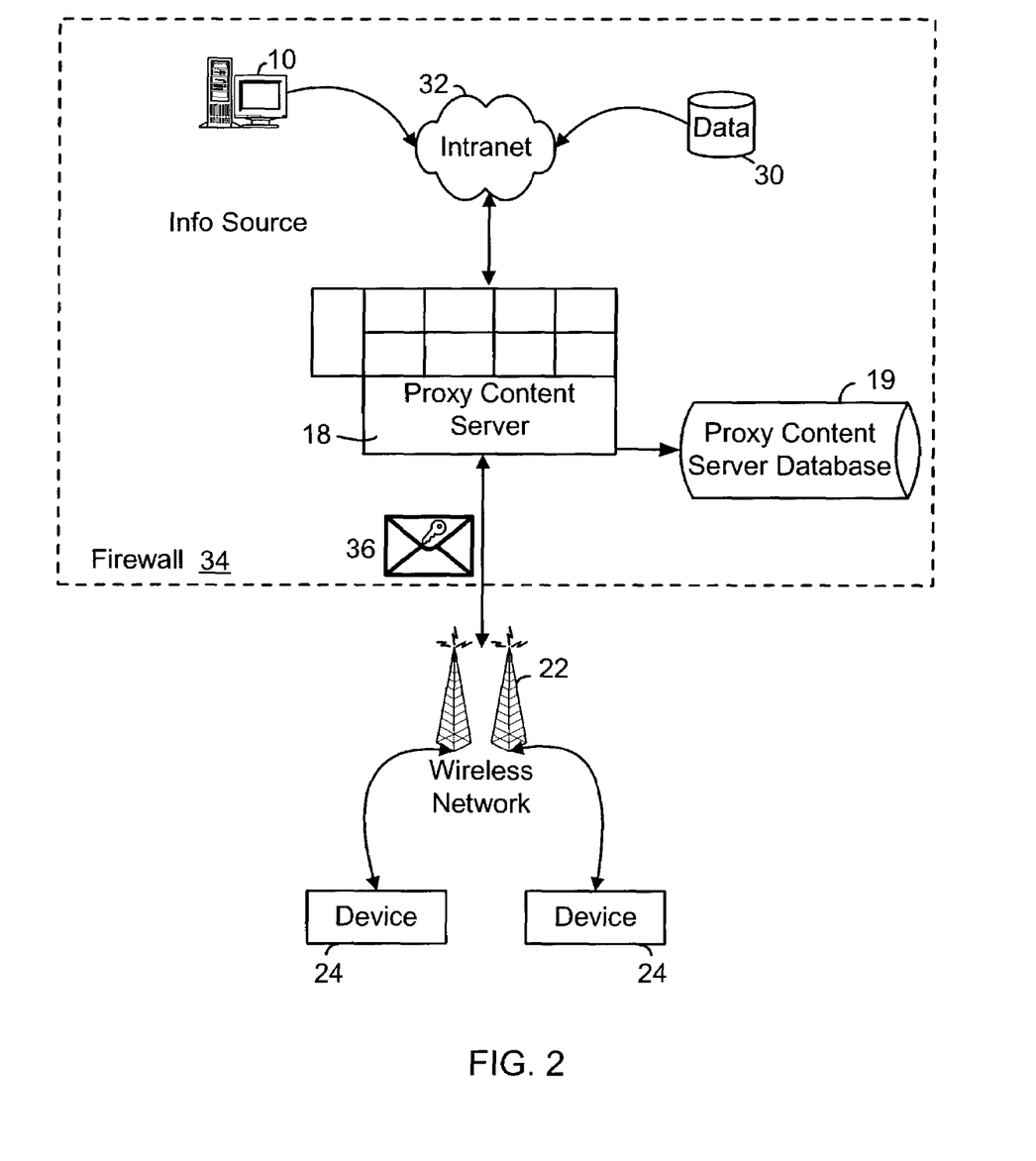
FIG. 2 is a block diagram of an exemplary system for pushing information to a mobile device from a Proxy Content Server located behind a firewall.

FIG. 2 is a block diagram of an exemplary system for pushing information to a mobile device 24 from a Proxy Content Server 18 located behind a firewall 34. This system is similar to the system described above with reference to FIG. 1, except the Information Sources 10a, 10b, Proxy Content Server 18, and Proxy Content Server Database 19 are contained within a firewall 34. In addition, the computer network illustrated in this embodiment is a local Intranet 32, and an additional data source 30 is included within the firewall 30 that is coupled to the Intranet 32 along with Information Source 10. The inclusion of the firewall 34 in this embodiment enables the Proxy Content Server 18 to provide greater security and more relevant information to the mobile device 24.

In operation, information from the Information Source 10 and additional data source 30 are transmitted to the Proxy Content Server 18 via the Intranet 32. The information is repackaged and sent collectively to the appropriate channel 21 of the Proxy Content Server 18, which encrypts the information and sends it through the firewall 34. The encrypted information 36 is sent to the wireless network 22, which transmits the encrypted information 36 to the device 24. The mobile device 24 decrypts the information and reorganizes the information for display to the user.

Since the information from the Information Source 10 and additional data source 30 is never transmitted outside of the firewall 34 in decrypted form, the security of the firewall 34 is effectively extended to include the device 24, creating a virtual private wireless network (VPWN). This embodiment might, for example, be best used when a corporation has a large amount of data to send to one or more of its employees. This information could be stored in the additional data source 30, and may include information such as inventory levels, sales contacts, delivery delays, part allocations, field service requests, or other types of information. In addition, information from the Information Source 10 may include alarms, announcements, or other critical just-in-time information for the user. The feed back signal from the mobile device 24, as described above, may be used by the Proxy Content Server 18 in order to track the location of company employees.

Figure 3:
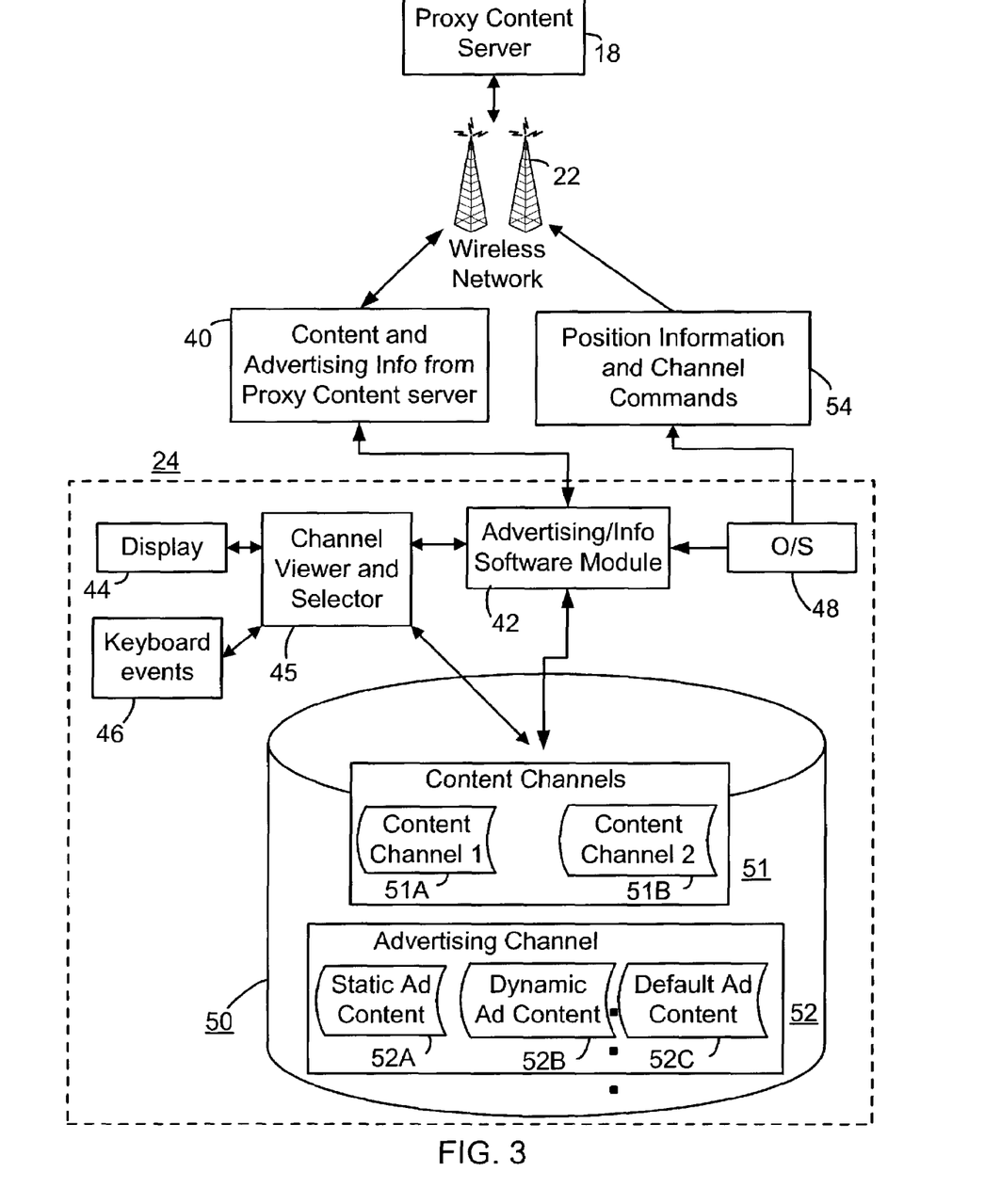
FIG. 3 is a block diagram illustrating an exemplary mobile device for use with the systems shown in FIGS. 1 and 2.

FIG. 3 is a block diagram illustrating an exemplary mobile device 24 for use with the systems shown in FIGS. 1 and 2. The mobile device 24 includes an advertising and information software module 42, a display 44, a keyboard 46, a channel viewer and selector module 45, an operating system 48, and a channel content database 50. The advertising and information software module 42, channel viewer and selector module 45 and operating system 48 may, for example, be executed by a processor in the mobile device 24, such as a microprocessor, a digital signal processor, or some other type of processing device. The channel content database 50 includes a plurality of memory locations 51, 52, with each memory location 51, 52 including both content channel information 51 and advertising content information 52. The advertising content 52 is further broken down into static advertising content 52A, dynamic advertising content 52B, and default advertising content 52C corresponding to a particular advertiser. Also illustrated in FIG. 3 are the Proxy Content Server 18 and the wireless network 22.

As the mobile device 24 moves around within the wireless network 22, packaged data 40 from the Proxy Content Server 18 is received by the advertising and information software module 40 in the mobile device 24. The packaged data 40 may include both content information, advertising information and other information, each of which may be processed differently by the advertising and information software module 42. In addition, the packaged data 40 may include a display command from the Proxy Content Server 18 instructing the mobile device 24 to display an advertisement or information bulletin already received and stored by the mobile device 24. The advertising and information software module 42 interacts with the channel viewer and selector module 45 to determine what the user is currently viewing, to send alerts and notifications of important changes and to send user channel commands back to the Proxy Content Server 18. The advertising software module 42 may also receive input from the Operating System (OS) 48 indicating the current location 54 of the mobile device 24 within the wireless network 22. This can be used to trigger important advertising messages and alerts to the user. The current location 54 of the device 24 is monitored by the OS 48, and is fed back to the Proxy Content Server 18 by the OS 48 in addition to being input to the advertising software module 42.

When content and advertising information 40 is received by the advertising and information software module 42, the software module 42 accesses a memory location 51, 52 in the channel content database 50 corresponding to the particular information source. The Proxy Content Server 18 tags the data to enable the advertising and information software module 42 to distinguish which location is best suited for the information. In this embodiment, content channels are separated from advertising channels so that the user has greater 'immediate' control over which advertisements are viewed. In other embodiments, the combining of real content and advertisements may have already been performed and the channels might contain both content and advertisement combined. As noted above, the memory locations 51, 52 in the channel content database 50 may include categories for content channels 51 A, 51B and static advertising content 52A, dynamic advertising content 52B, and default advertising content 52C.

The static advertising content 52A in a memory location 52 may include static information relating to the identity of an advertiser, such as a logo, a company banner, a location sensitive address, or other information that does not often change. The dynamic advertising content 52B in the memory location 52 may change or vary at any given time. For example, the dynamic advertising content 52B may include regularly changing advertising information, such as a special offering, a discount, a discount coupon, a sale, or other time-sensitive information. The default advertising content 52C might change rarely and is used whenever there is no new dynamic advertising content 52B. For example, the default advertising content 52C may include advertising information, such as a price list, a menu, or some other type of advertising information that does not often change.

Content channels are separated by tags provided by the Proxy Content Server 18, and therefore match what has been provided and configured on the Proxy Content Server 18. This allows for dynamic additional channels to be added on the Proxy Content Server 18 and the content database 50 on the mobile device 24 mirrors those content channels. Each time a new channel is added, the advertising and information software module 42 will dynamically create a new database entry for the new channel. There is also a master list of all content channels that is presented to the user when they are selecting between channels. This is also true for advertising channels, which in most situations match the content channels. Thus each time a new tag is received, including channel name, identifier and other size and configuration information, a new advertising and/or content channel appears for the user to access. The user can then choose to discontinue data flow into that channel, or accept data into that channel based on their interests.

The advertising and information software module 42 adds newly received information 40 to its proper content database 51A, 51B or 52A–52C. If the information 40 is location-sensitive, then the advertising and information software module 42 may also add a location field to the information 40 that is generated based on the location information 54 received from the OS 48.

An example of one set of steps that can be followed by the mobile device user when using the invention is as follows:

Information arrives from the Proxy Content Server 18 and is placed into its correct channel, or one is created to accommodate new information channels. This also updates the master list of all channels that is presented to the user when they jump between channels.

From time to time, the user enters the Channel Viewer and Selector software module 45 to view the channels and see what information has arrived. If information arrives and the user is not currently viewing information channels, then a notification might be activated to alert the user that new information has been pushed to the mobile device 24. Notifications may be vibrator-based, sound-based, flickering-LED type notifications, or some other type of notification.

As information is viewed, the Channel Viewer and Selector 45 presents the content information 51A, 51B to the user and monitors the information for meta-tags within the content. Meta tags are embedded control sequences that the Proxy Content Server 18 has inserted to indicate when advertising should be inserted. These tags would normally include an advertising name, a corresponding advertising identifier and perhaps additional information like the number of advertising points for viewing the advertisement.

The user may then select the highlighted advertising tag, which could be italicised, highlighted, bolded or identified in some other way on the mobile device 24. For example, the user may move a cursor to the highlighted tag and make a selection to "view advertisement".

The Channel Viewer and Selector module 45 uses the advertising tag to retrieve the corresponding advertising information and inserts it into the exact space indicated by the meta tag. This would normally have the effect of expanding the space when the mobile device 24 supports such functionality. In other embodiments this might have the effect of opening a new window or screen to display the advertisement. The user can then close the additional window and continue with her normal channel viewing activities.

In addition, the Channel Viewer and Selector software module 45 combines information from either the default or dynamic advertising channel 52B, 52C with information from the static advertising channel 52A in order to generate a complete advertisement or information bulletin. The information combined from the default or dynamic advertising channel 52B, 52C may, for example, be either a newly received advertisement or information bulletin, or may be stored information identified by a display command from the Proxy Content Server 18.

Once the advertisement is constructed by the Channel Viewer and Selector software module 45, the user is presented with a choice on the display 44 as to whether the user wishes to view the advertisement. If the user agrees to view the advertisement, for example using the keyboard 46, then the advertisement is printed to the display 44 and the number of advertising points indicated or a default number is added to the user's total.

Figure 4:
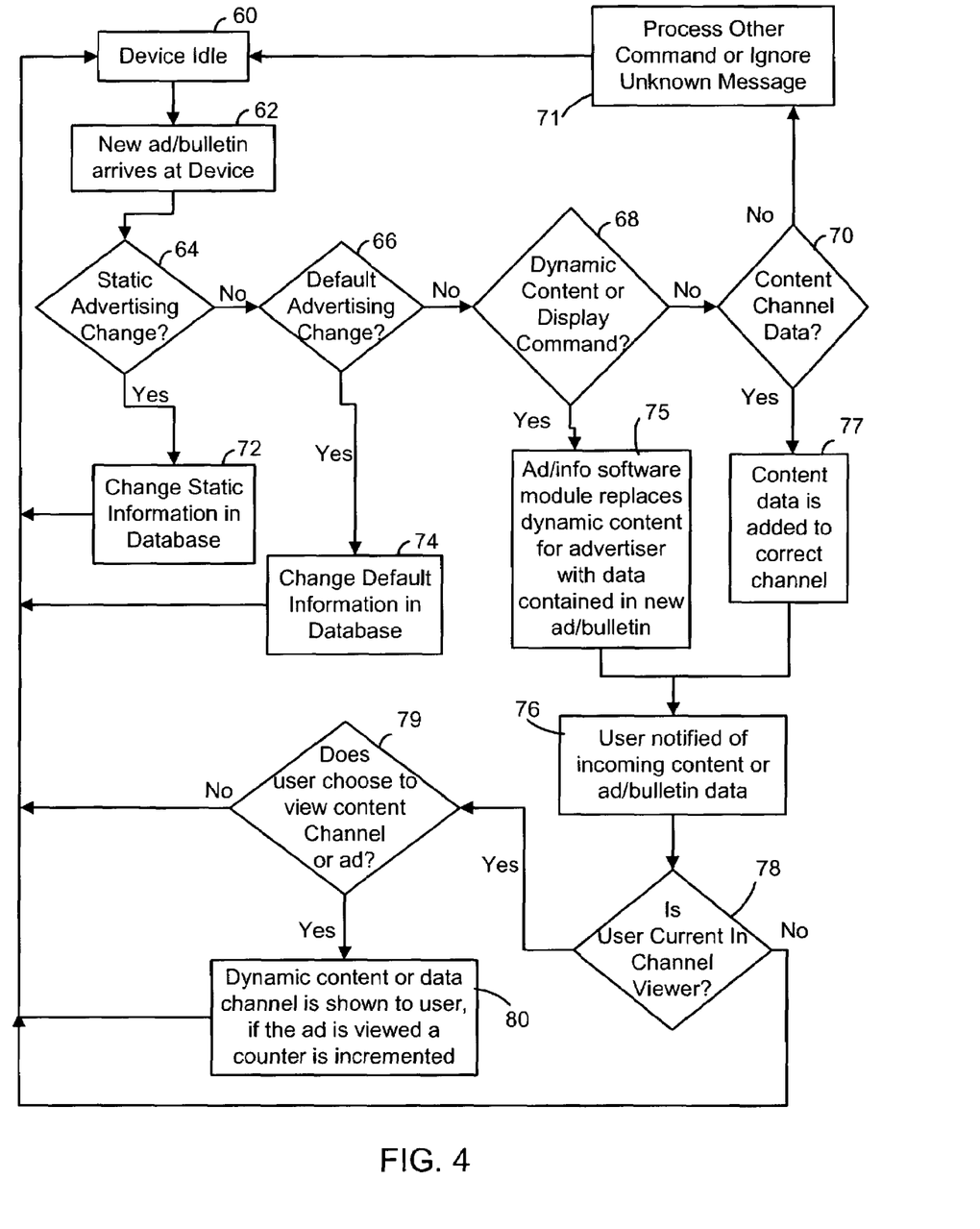
FIG. 4 is a flow diagram illustrating an exemplary method of pushing information to a mobile device.

FIG. 4 is a flow diagram illustrating an exemplary method of pushing information to a mobile device 24. In step 60 the mobile device is in an idle state awaiting an event. In step 62, a new advertisement or other content information is received by the mobile device 24. The advertisement and information software module 42 then accesses the channel content database 50 in order to organize the new information into an assembled advertisement or information bulletin, or to add information to a content channel 51A, 51B.

Upon accessing the channel content database 50, the advertisement and information software module 42 determines the category of the received information in steps 64–70. In step 64, the advertisement and information software module 42 determines if the received information includes static advertising content, such as an address change, a logo change, or some other variety of static information. If so, then the static advertising content is saved to the static content database 52A at step 72, and the mobile device returns to an idle state (step 60). If the received information is not static information, then the advertisement and information software module determines, in step 66, whether the received information includes new default advertising content, such as a new default price for a meal, or some other type of default advertising information. If the received information is categorized as default information, then the information is saved in the default content database 52C in step 74, and the mobile device returns to its idle state (step 60). If the received information is not default information, then the advertisement and information software module 42 determines in step 68 whether the information is either new dynamic advertising content or a display command. If the received information is not dynamic advertising content or a display command, then a check is made to see if new channel information has been received (step 70). If the received information is not new channel information then, at step 71, the mobile device 24 either ignores the information or processes the information if it is a command other than a display command, and returns to its idle state (step 60).

If the information received by the mobile device 24 is new dynamic advertising content or a display command (step 68), then the advertisement and information module 42 saves the information to the dynamic content database 52B and replaces any old dynamic information that was present (step 75). Similarly, if the received information is a display command, i.e. display and advertisement now, then in step 76 the advertisement and information module 42 notifies the user of the advertisement or information bulletin. If the user is currently in the Channel Viewer and Selector Module 45, then the user is given the chance to immediately view the new advertisement or bulletin (steps 78 and 79). Otherwise, the device returns to the idle state and the user is given a notification that new data or advertisement information has arrived. At step 79, the user is presented with a choice to view the advertisement or information bulletin. If the user does not choose to view the ad or bulletin, then the device 24 returns to the idle state (step 60). If the user does choose to view the ad or bulletin, however, then the ad or bulletin is displayed in step 80 and then the device 24 returns to the idle state (step 60).

If the information that has arrived was content channel data (step 70) then the data is added to the correct information channel at step 77, as described above, and the user is notified that content has arrived for a given channel at step 76. If the user is currently in the Channel Viewer and Selector module (step 78), then the user is given the option, at step 79, to switch to that channel and view the new content (step 80). Otherwise, if the user is not currently in the Channel view and Selector module (step 78), then the user is notified and the device returns to the idle state (step 60). In effect, once new data is received and the user is notified of the new data, a user that is currently viewing channel information can immediately jump to see what new information has arrived. If bulletins and advertising data has arrived, then the user can jump to the related information channel and the new advertising message will appear for her to select.

In order to supplement a user's subscription costs by requiring a user to view a set number of advertisements, a counter may be added to the O/S in order to count the number of advertisements the user has viewed. If this measure has been implemented, then in step 80, the advertisement viewing counter may be incremented before the device returns to an idle state. In one embodiment, each advertisement might be counted as a single value or each one could be weighted based on its importance to the advertiser or based on the price the advertiser paid to have the advertisement included in the content channel.

Figure 5:
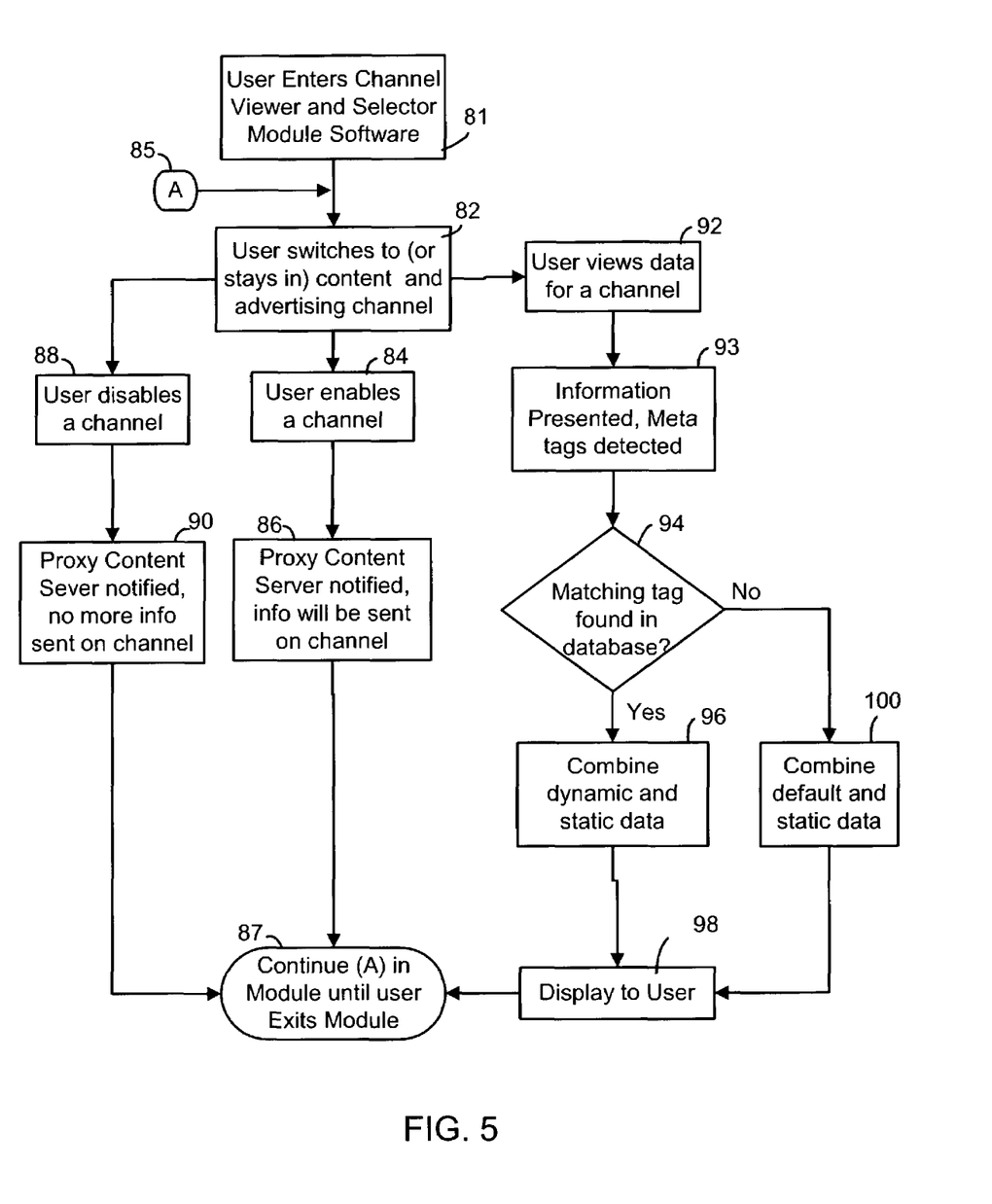
FIG. 5 is a flow diagram illustrating an exemplary method of viewing and controlling the information pushed from the Proxy Content Server to a mobile device.

FIG. 5 is a flow diagram illustrating an exemplary method of viewing and controlling the information pushed from the Proxy Content Server 18 to a mobile device 24. In step 81 the user has decided to enter the Channel Viewer and Selector module 45. This might have occurred after a notification informing the user that new information has arrived, or as a result of the user wanting to view a channel. In step 82, a mobile device user accesses a channel interface where the user is provided a master list of all channels to view. The user may decide to stay in the current channel as information streams past such that the user can scroll through the information currently in the channel. The interface may, for example, be a specially loaded software application on the mobile device 24 that enables the user to graphically select or de-select content the user is interested in receiving from the Proxy Content Server 18. In another embodiment the interface may be a wireless web-browser that enables the mobile device user to access and review HTML or WML based web pages with the mobile device 24. For example, a wireless web-browser interface may provided a URL that enables the user to sign-in to her account and modify the information channels in the Proxy Content Server 18 that are configured for her particular mobile device. In addition, the interface may enable the user to modify other preferences for receiving information bulletins and advertisements.

Upon accessing the interface, the mobile device user may enable a channel 21 in the Proxy Content Server 18 at step 84, disable a channel 21 in the Proxy Content Server 18 at step 88, or view all the data available from a channel 21 in the Proxy Content Server at step 92. If the mobile device user enables a channel in the Proxy Content Server 18 (step 84), then the Proxy Content Server 18 is notified of the enabled channel at step 86 and begins pushing information on the enabled channel to the mobile device 24. If the mobile device user disables a channel in the Proxy Content Server 18 (step 88), then the Proxy Content Server 18 is notified of the disabled channel at step 90, and stops pushing information to the mobile device 24 from the designated channel. In either case, at step 87, the mobile device user remains in the Channel Viewer and Selector module 45 unit exiting the software application, and the method continues at step 85.

If the user chooses to view all data from a given channel (step 92), then the content information is presented to the user in a manner compatible with the mobile device 24. As the information viewed and scanned, the Channel Viewer and Selector module 45 monitors the information for meta tags within the content screen at step 93. If a meta tag is detected, then at step 94 the Channel Viewer and Selector module accesses the Channel Content database to match the tag. During this process, the Channel Viewer and Selector module 45 determines whether there is any dynamic advertising content 52B that matches the meta tag at step 94. If dynamic advertising content 52B exists, then the Channel Viewer and Selector module 45 combines the dynamic advertising content 52B and static advertising content 52A in step 96, and presents it to the user on the device's display 44 in step 98. If no dynamic advertising content 52B exists, however, then the Channel Viewer and Selector module 45 combines the static advertising content 52A with the default advertising content 52C for display to the user in step 100. This combined information is then presented to the user in the location specified by the meta tag at step 98. After the information is displayed to the user at step 98, the mobile device user remains in the Channel Viewer and Selector module 45 unit exiting the software application, and the method continues at step 85.

In one embodiment, the user preferences set in steps 84, 88, and 92, are stored by the Proxy Content Server 18 in the Proxy Content Server Database 19.

Figure 6:
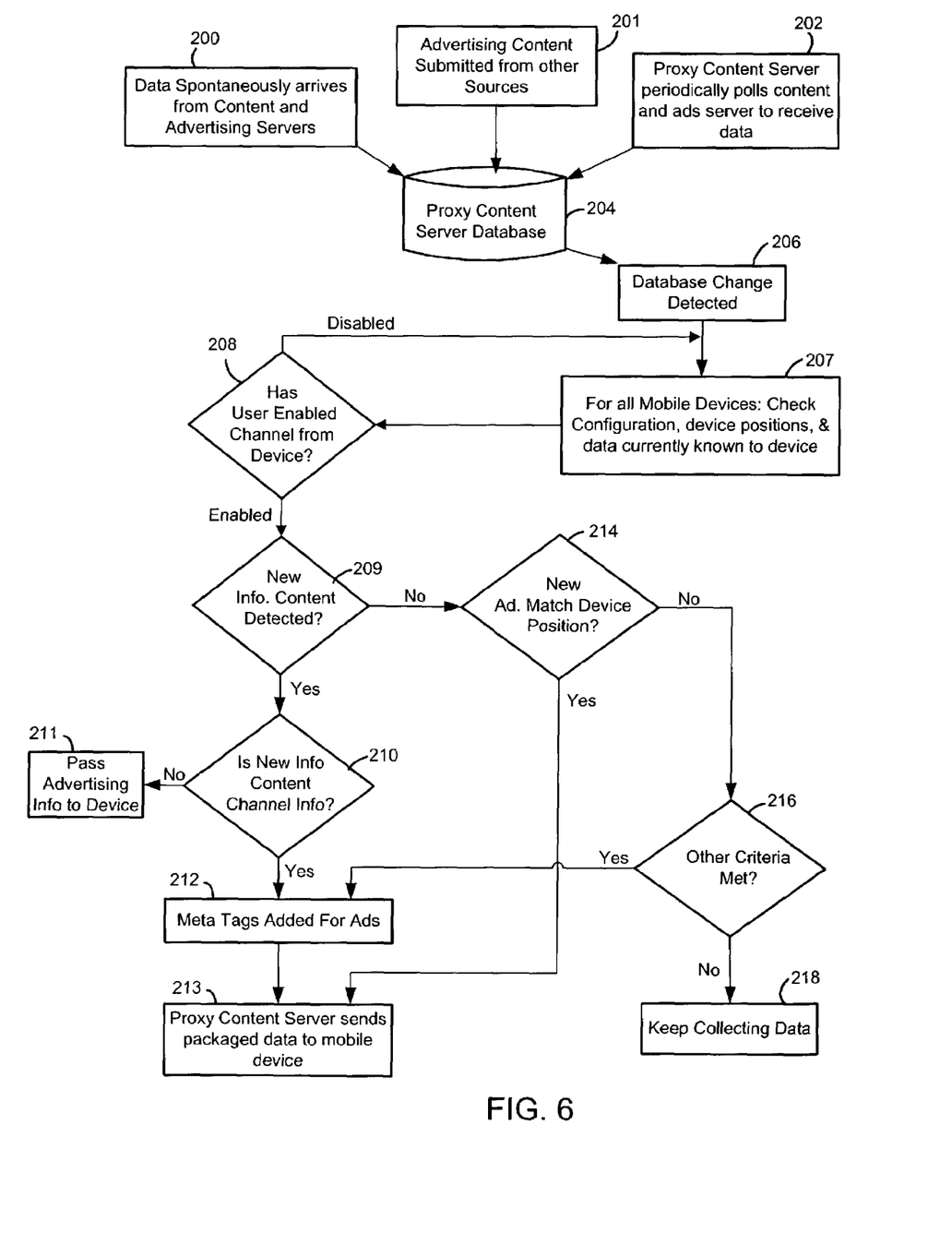
FIG. 6 is a flow diagram illustrating an exemplary method of pushing updated information to a mobile device.

FIG. 6 is a flow diagram illustrating an exemplary method of pushing updated information to a mobile device 24. Information is received by the Proxy Content Server 18 from a Information Source 10 in step 200 or 204. The information may be content information 12A or advertisement information 12B. As noted above, the Proxy Content Server 18 and Information Source 10 may be set up such that the Proxy Content Server 18 periodically polls the Information Source 10 for updated information, or such that the Information Source 10 automatically pushes updated information to the Proxy Content Server 18. If information is automatically pushed from the Information Source 10 to the Proxy Content Server 18, then the method begins at step 200. If, however, the Proxy Content Server 18 must poll the Information Source 10 for updated information, then the method begins at step 202. Otherwise the advertising information might be received from another source, like fax, phone call or some other manual source. In any case, once information from the Information Source 10 is received by the Proxy Content Server 18 at steps 200, 201 or 202, the information is stored to the Proxy Content Server Database 19 at step 204, and is integrated as required, i.e. older content might be purged in favour of the newer, more up to date content.

At step 206, the information stored in the Proxy Content Server Database 19 is monitored, and a signal, such as a database notification, is generated each time a change is detected. The signal generated at step 206 may, for example, be detected by a content monitoring module operating in the Proxy Content Server 18. Upon detecting a change to the database 19, the Proxy Content Server 19 accesses information stored in the Proxy Content Server Database 19 related to all known mobile devices 22 (step 207). In this step, the Proxy Content Server 18 checks known mobile devices 24 to see if they have the particular channel 21 enabled or disabled, to determine the position of the mobile device 24, and/or to process other configuration-related information. Whether the database change was for information content or advertising content, the channel should be enabled before the data is sent to the mobile device (step 208). If the channel is disabled, then the Proxy Content Server 18 continues to look at other mobile device configurations checking for one that has it enabled. If the channel is enabled, and if the information added to the database was content information (step 210), then the information is formatted for delivery to the mobile device 24 (steps 211–213). If the information added to the database was advertising information (step 210), then the advertising information is passed to the device (step 211). First, the Proxy Content Server 18 reviews the information to see if meta tags should be added for embedded advertising (step 212). This insertion of meta tags is performed if the content is information content (step 212). To make this determination the Proxy Content Server 18 can use several standard techniques including: checking a configuration file to follow a frequency of insertion, placing ads at the beginning or ending of an information data block, watching for paragraph breaks before inserting the meta tags, or many other similar logical steps. The meta tag contains at least the name of the advertising that is seen by the user, a cross reference value to reach the full advertising on the mobile device 24 and a advertising points counter value. Once this insertion is completed the data package is sent to the mobile device at step 213.

If, at step 209, no new information content is detected, then an additional step may be performed on the received data to determine whether the new information is advertising information and whether any position criteria has been met (step 214). This test (step 214) may be performed using several methods. For instance, the original information may have a location string attached to the information that includes a city, region, vicinity, state or country value. The location string can then be matched to the current mobile device 24 position as fed back from the mobile device 24 itself. If a position match has occurred, then the new advertising content is packaged and sent to the mobile device (step 213). If, however, no position match is detected at step 214, then the Proxy Content Server 18 determines, at step 216, whether the information falls within some other criteria for sending to the mobile device 24. This could be criteria determined by the Proxy Content Server 18 or some other criteria requested by the mobile device user for automatic transmission. Other pre-selected categories of changed information may include, for example, the frequency of change in a given area, percentage of change for a certain number or value being watched, volume or level of change to the information change, some important advertising bulletin that should be sent, or some other criteria. If the information falls within a pre-selected category, then if the information is content information meta tags are added as described earlier (step 212) and the information is packaged and transmitted over the wireless network 22 to the mobile device 24 at step 212. Otherwise, no transmission to the mobile device 24 is made, and the Proxy Content Server 18 continues to receive and store data from the Information Source 10 at step 218.

Figure 7:
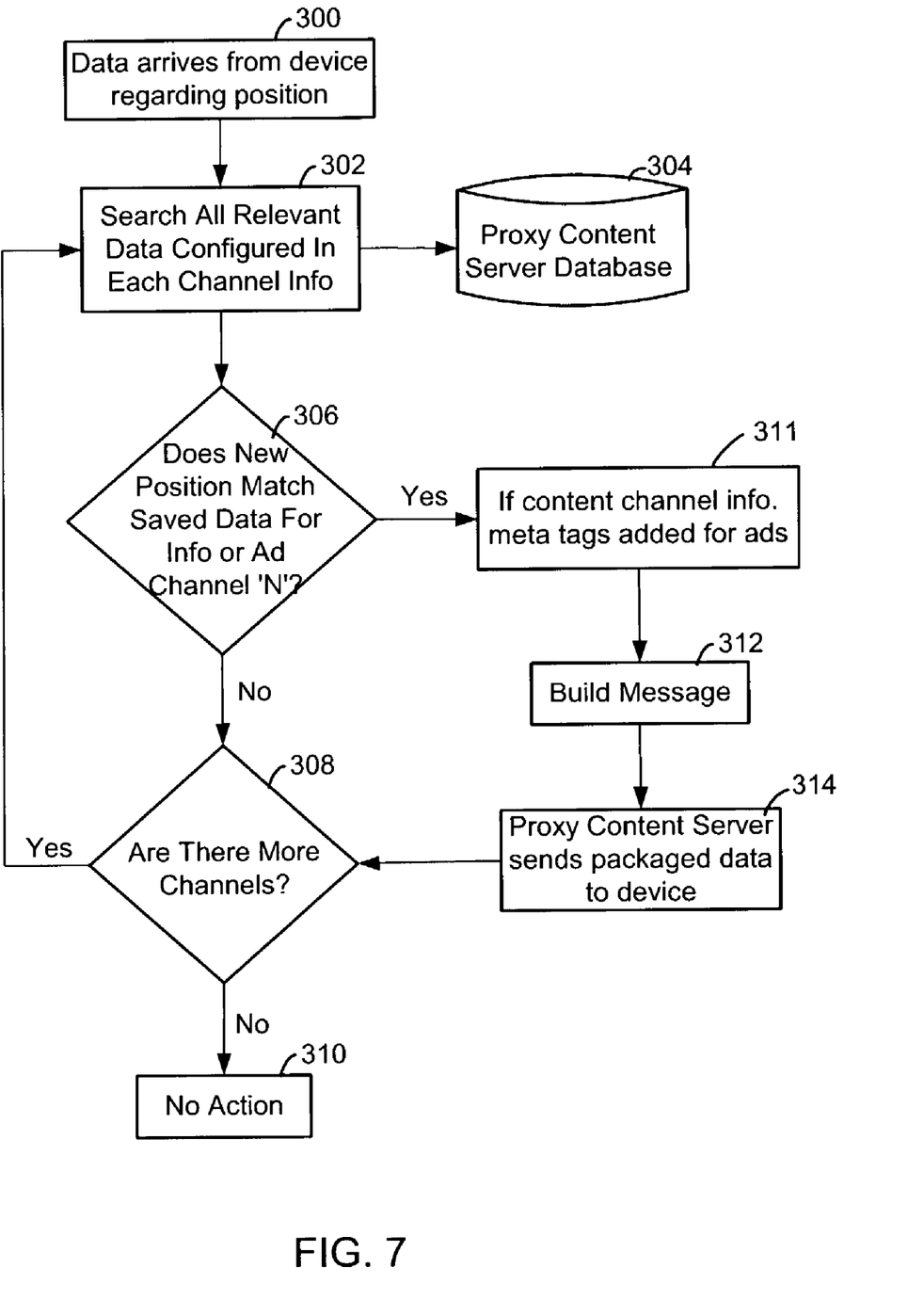
FIG. 7 is a flow diagram illustrating an exemplary method of pushing information to a mobile device based on the position of the mobile device in a wireless network.

FIG. 7 is a flow diagram illustrating an exemplary method of pushing information to a mobile device 24 based on the position of the mobile device 24 in a wireless network 22. At step 300, the Proxy Content Server 18 receives a feedback signal indicating the position of the mobile device 24 in the wireless network 22. As noted above, the feedback signal may be sent from a system in the mobile device 24 that tracks the device's location, or may be sent from another tracking device, such as a base station in the wireless network 22. Upon receiving the feedback signal indicating the location of the mobile device 24, the Proxy Content Server 18 determines if the content information or advertising information category assigned a particular channel 21 is relevant to the device's location (steps 302, 306). In one embodiment an ASCII string, geo-code, location tag, or some other type of identifying characteristic may be embedded in the information stored within the channel locations 21. This embedded information enables two common points of reference to be matched, such as a city name, a county name, a country name, a base station code, or some other type of reference. For example, one information channel 21 may be designated to store all information from a Information Source 10 relating to an advertiser that has one or more operating locations in the general vicinity of the mobile device user. When the feedback signal received by the Proxy Content Server 18 indicates, for example, that the mobile device 24 is within the coverage area of a base station located near one of the advertiser's operating locations, then the Proxy Content Server 18 may determine, at step 306, that the information in the information channel 21 is now relevant to the mobile device's location.

If information in the particular channel 21 is determined to be relevant to the location of the mobile device 24, then the Proxy Content Server 18 formats the information and, if content information is being sent, inserts meta tags for advertising content (step 311). The message is then formatted and built for transmission over the wireless network 22 (step 312) and transmits the data packet to the mobile device (step 314). In step 308, the Proxy Content Server 18 determines if there are any other channels 21 to be searched. If other channels 21 exist to be searched, then the method returns to step 302. Otherwise, the Proxy Content Server 18 does not transmit any information, and returns to an idle state at step 310.

Figure 8:
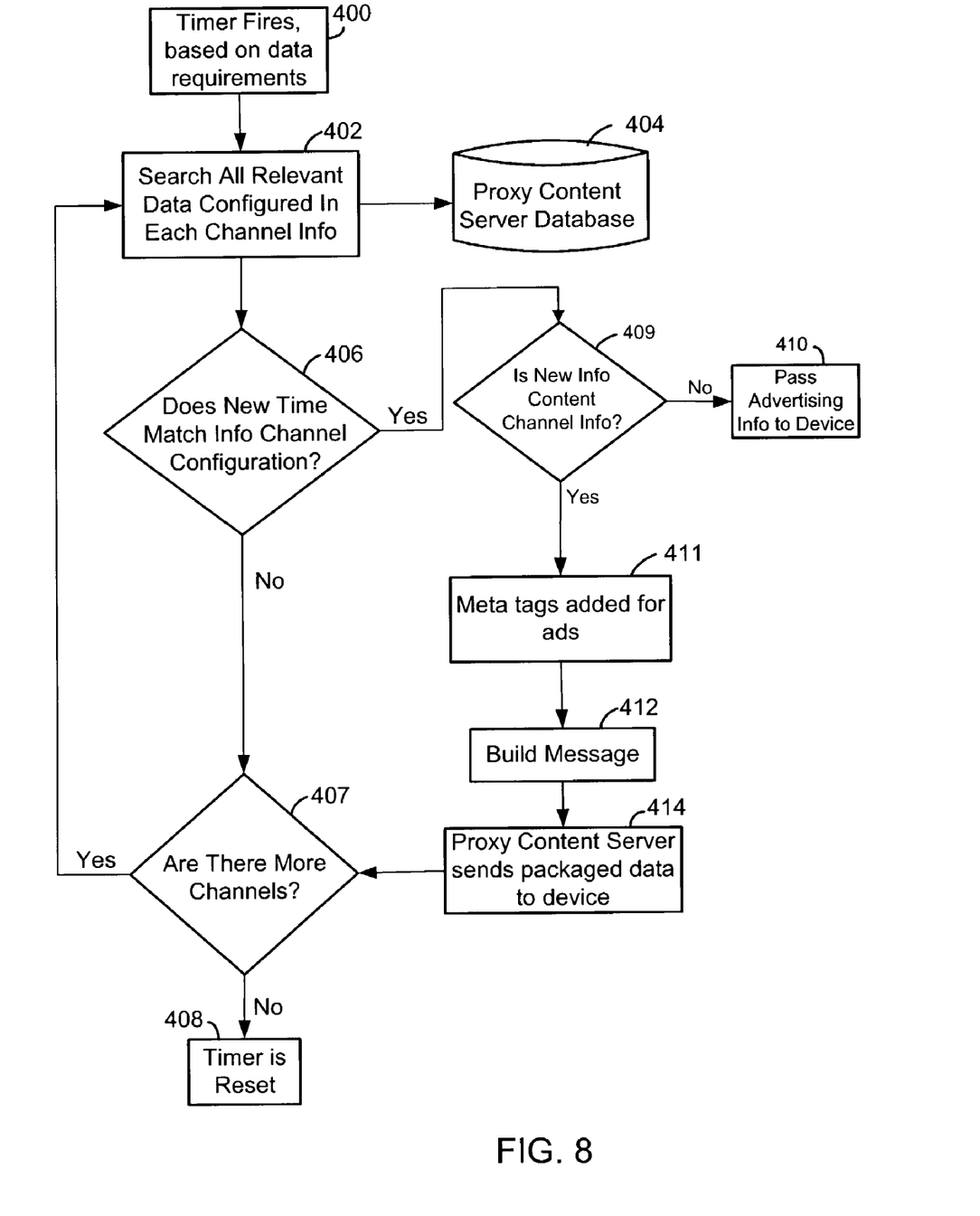
FIG. 8 is a flow diagram illustrating an exemplary method of pushing information to a mobile device based on a triggering event.

FIG. 8 is a flow diagram illustrating an exemplary method of pushing information to a mobile device 24 based on a triggering event. At step 400, the Proxy Content Server 18 detects a triggering event, such as a timer firing. The Proxy Content Server 18 may, for example, control the operation of one or more timing devices that are set to generate alarm signals at significant intervals, such as lunchtime, suppertime, or some other significant time of the day. The timing device may be initialized based on requirements established by a mobile device user, an advertiser, or some other interested party.

Upon detecting a triggering event, the Proxy Content Server 18 determines if any of the information categories assigned a particular channel 21 is relevant to the triggering event (steps 302, 306). For example, an information channel 21 assigned to information from a Information Source 10 relating to restaurant advertisements, may be designated as relevant to triggering events from a timing device set to fire at lunchtime or suppertime. If the Proxy Content Server 18 determines, at step 406, that the triggering event is relevant to information in a channel 21, then the Proxy Content Server 18 determines if the information is content channel information in step 409. If the information is advertising information, then the advertising is passed on to the device (step 410). If the information is content meta tags for advertising, then the tags are added following methods already described in FIG. 6 (step 411). Then the information is formatted for transmission over the wireless network 22 at step 412, and transmitted to the wireless device 24 at step 414. In step 407, the Proxy Content Server 18 determines if there are any other channels 21 to be searched. If other channels exist to be searched, then the method returns to step 402. Otherwise, the timer is reset and the Proxy Content Server 18 returns to its idle state at step 408.

Figure 9:
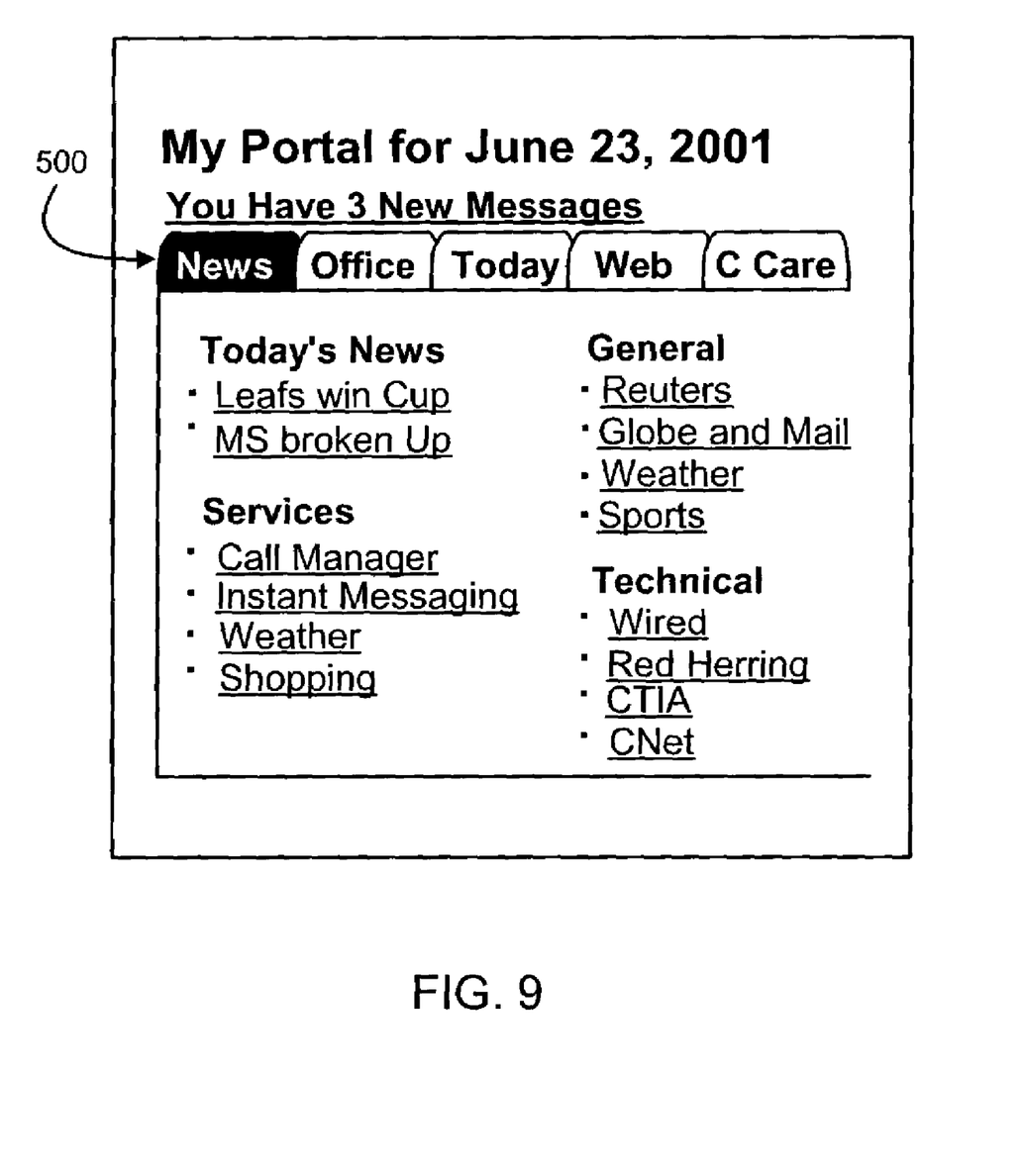
FIG. 9 shows a exemplary user interface for viewing information pushed to a mobile device 24.

FIG. 9 shows a exemplary user interface for viewing information pushed to a mobile device 24. The user interface includes a toolbar or menu tabs 500 that enable a user of the device to select different information categories. For example, the selected information category illustrated in FIG. 9 is a news channel available at the Proxy Content Server 18. The interface includes graphical links to display each news channel to which the user has subscribed and that have been pushed to the device from the Proxy Content Server. It should be understood, however, that the categories and news channels illustrated in FIG. 9 are provided for illustrative purposes only.

This written description uses examples to disclose the invention, including the best mode, and also to enable any person skilled in the art to make and use the invention. The patentable scope of the invention is defined by the claims, and may include other examples that occur to those skilled in the art.

We claim:

1. A method of displaying advertising content on a mobile device, comprising:
   receiving advertising data;
   categorizing the advertising data as either static advertising content, dynamic advertising content, or default advertising content;
   static advertising content being advertising data that relates to an identity of an advertiser;
   dynamic advertising content being advertising data that is time-sensitive and that includes information relating to one or more specific advertisements from the advertiser;
   default advertising content being advertising data that is not time-sensitive and that includes information relating to one or more specific advertisements from the advertiser;
   combining static advertising content with either dynamic advertising content or default advertising content to generate an advertising message; and
   displaying the advertising message on the mobile device.

2. The method of claim 1, wherein the advertising data is received and stored on the mobile device.

3. The method of claim 1, further comprising:
   receiving computer instructions identifying advertising content for display on the mobile device; and
   in response to receiving the computer instructions, determining if dynamic advertising content is stored on the mobile device;
   if dynamic advertising content is stored on the mobile device, then combining the dynamic advertising content with static advertising content to generate the advertising message; and
   if dynamic advertising content is not stored on the mobile device, then combining default advertising content with static advertising content to generate the advertising message.

4. The method of claim 3, wherein the computer instructions are included in information received over a wireless network by the mobile device from a server operating on a computer network.

5. The method of claim 4, wherein the computer instructions are included in meta data.

6. The method of claim 1, wherein the static advertising content includes one or more of a logo, a company banner and an address.

7. The method of claim 1, wherein the dynamic advertising content includes one or more of a time-sensitive offering, a discount, a coupon, and a sale.

8. The method of claim 1, wherein the default advertising content includes one or more of a price list and a menu.

9. A mobile device configured to receive information over a wireless network from a server operating on a computer network, comprising:
- advertising information software instructions configured to receive advertising data and categorize the advertising data as either static advertising content, dynamic advertising content or default advertising content;
  - static advertising content being advertising data that relates to an identity of an advertiser;
  - dynamic advertising content being advertising data that is time-sensitive and that includes information relating to one or more specific advertisements from the advertiser;
  - default advertising content being advertising data that is not time-sensitive and that includes information relating to one or more specific advertisements from the advertiser; and
- channel viewing software instructions configured to combine static advertising content with either dynamic advertising content or default advertising content to generate an advertising message for display on the mobile device.

10. The mobile device of claim 9, further comprising:
a database configured to store the categorized advertising data.

11. The mobile device of claim 10, wherein the database comprises:
- a first memory location for storing static advertising content;
- a second memory location for storing dynamic advertising content; and
- a third memory location for storing default advertising content.

12. The mobile device of claim 10, wherein the channel viewing software instructions are further configured to:
- receive computer instructions identifying advertising content for display on the mobile device; and
- in response to receiving the computer instructions, determine if dynamic advertising content is stored in the database;
- if dynamic advertising content is stored in the database, then combining the dynamic advertising content with static advertising content to generate the advertising message; and
- if dynamic advertising content is not stored in the database, then combining default advertising content with static advertising content to generate the advertising message.

13. The mobile device of claim 12, wherein the computer instructions are included in information received over a wireless network by the mobile device from a server operating on a computer network.

14. The mobile device of claim 13, wherein the computer instructions are included in meta data.

* * * * *

UNITED STATES PATENT AND TRADEMARK OFFICE
CERTIFICATE OF CORRECTION

PATENT NO. : 7,076,244 B2  Page 1 of 1
APPLICATION NO. : 10/201495
DATED : July 11, 2006
INVENTOR(S) : Lazaridis et al.

It is certified that error appears in the above-identified patent and that said Letters Patent is hereby corrected as shown below:

Column 14, line 48
Please replace "The method of claim 1" with -- The method of claim 2 --

Signed and Sealed this

Twenty-second Day of July, 2008

JON W. DUDAS
*Director of the United States Patent and Trademark Office*